March 28, 1944.  T. M. WRIGHT  2,345,545
SELECTOR MECHANISM FOR AUTOMATIC PHONOGRAPHS
Filed Feb. 18, 1941  6 Sheets-Sheet 1

INVENTOR
Theodore M. Wright,
BY Walter P. Guyer
ATTORNEY

March 28, 1944.  T. M. WRIGHT  2,345,545
SELECTOR MECHANISM FOR AUTOMATIC PHONOGRAPHS
Filed Feb. 18, 1941  6 Sheets-Sheet 2

INVENTOR
Theodore M. Wright,
BY Walter P. Geyer
ATTORNEY

March 28, 1944.  T. M. WRIGHT  2,345,545
SELECTOR MECHANISM FOR AUTOMATIC PHONOGRAPHS
Filed Feb. 18, 1941  6 Sheets-Sheet 3

Fig. 9.

INVENTOR
Theodore M. Wright,
BY Walter P. Geyer
ATTORNEY

Fig. 10.

March 28, 1944.   T. M. WRIGHT   2,345,545
SELECTOR MECHANISM FOR AUTOMATIC PHONOGRAPHS
Filed Feb. 18, 1941   6 Sheets-Sheet 5

Fig. 11.

INVENTOR
Theodore M. Wright,
BY
Walter P. Geyer
ATTORNEY

March 28, 1944.  T. M. WRIGHT  2,345,545

SELECTOR MECHANISM FOR AUTOMATIC PHONOGRAPHS

Filed Feb. 18, 1941  6 Sheets-Sheet 6

INVENTOR
Theodore M. Wright
BY
ATTORNEY

Patented Mar. 28, 1944

2,345,545

UNITED STATES PATENT OFFICE 2,345,545

SELECTOR MECHANISM FOR AUTOMATIC PHONOGRAPHS

Theodore M. Wright, North Tonawanda, N. Y., assignor to The Rudolph Wurlitzer Company, North Tonawanda, N. Y., a corporation of Ohio Application February 18, 1941, Serial No. 379,434

16 Claims. (Cl. 192—139)

This invention relates generally to certain new and useful improvements in selector mechanisms, but more particularly to a mechanism for the selective control of records in an automatic phonograph.

It has for one of its objects to provide a selector mechanism of this character which is mechanical, and which is positive and reliable in its selective governing operations.

A further object is the provision of a mechanical selector mechanism which is compact and inexpensive in construction and composed of a minimum number of parts which are rugged in construction to withstand the use to which they are subjected, and which are so designed as to be expeditious in the selecting operation.

Other features of the invention reside in the construction and arrangement of parts hereinafter described and particularly pointed out in the appended claims.

In the accompanying drawings:

Figure 2 is a cross section taken substantially in the plane of line 2—2, Figure 1, showing the position of the parts prior to making a selection.

Similar characters of reference indicate corresponding parts throughout the several views.

By way of example, my selector mechanism has been shown with the selectively-governed parts of an automatic phonograph, and more particularly those parts disclosed in the Hokanson Patent No. 2,096,718, issued October 26, 1937. In this connection, however, only that much of the selectively-governed mechanism of such patent has been disclosed which is directly governed or actuated by my selector mechanism.

The Hokanson patent discloses a vertically-adjustable turntable adapted to support a stack of records, means for elevating the turntable to variable heights to bring a selected record in playing position relative to the tone arm, and a record-engaging means for elevating any record or records above the one selected for play to a position to provide an operating clearance for the movement of the tone arm during the playing of the selected record. In practice, the phonograph is coin-controlled.

Referring now to the drawings, 20 indicates a slidable clutch-collar feathered on a driven shaft 21 and having a clutch lever 20ª operatively associated therewith for shifting it to its respective positions for governing the selective playing of the records of the phonograph, this clutch assembly being adapted for direct control by my improved selector mechanism. Motion is normally transmitted to this shaft from the motor of the phonograph through the medium of a gear 22 and bevel gears 23. Loosely mounted on one end of the shaft 21 at one side of the clutch collar 20, is a worm 24 which meshes with a worm wheel 25 fixed on a shaft 26, the latter having a cam 27 thereon for controlling certain movements of the clutch collar. When motion is caused to be transmitted to the cam shaft 26, that mechanism of the phonograph for splitting the record stack above the record selected for play is likewise rendered operative. Loosely mounted on the shaft 21 at the opposite side of the clutch collar 20 is a gear 28 meshing with a similar gear 29 fixed on one end of a countershaft 30, the opposite end of the latter having a worm 31 thereon adapted to transmit motion to that mechanism of the phonograph with the records selected for play. The opposite ends of the shiftable clutch collar and the companion mating ends of the worm 24 and gear 28, respectively, have coupling pins 32 or the like thereon for releasably clutching these parts to in turn transmit motion to the cam shaft 26 or the countershaft 30. As shown in Figure 2, a spring 33 applied to the pivot pin 34 of the clutch-actuating lever 20ª normally urges this lever in a direction to shift the clutch collar into driving engagement with the worm 24.

Figure 9:
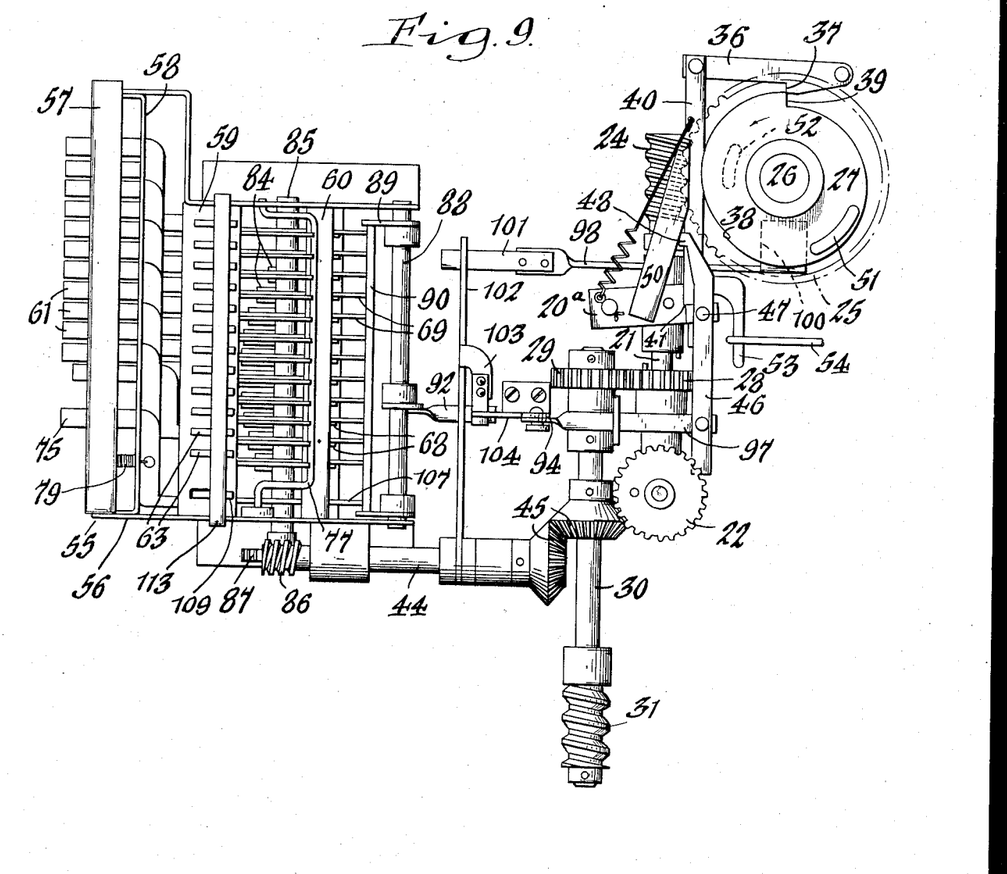
Figure 9 is a top plan view of the selector mechanism and the associated selectively-governed mechanism of the phonograph, showing the position of the parts after a selector element has been depressed and corresponds to the position of the parts shown in Figure 3.

Pivoted at 35 alongside the cam 27 and in bearing engagement with its periphery is a horizontally-swinging lever 36 having a tooth-like projection 37 thereon for cooperative engagement with one or the other of a shallow notch 38 and a deep notch 39. At its free end this lever has pivotally connected thereto an oscillatable tie bar or link 40 whose free end is reduced in width to provide a shoulder 41 adapted to releasably abut against the opposing offset edge of the clutch-shifting lever 20ª. A spring 42 connected to the tie bar constantly urges it into cooperative engagement with the clutch lever and its connecting lever 36 in a direction toward the cam-periphery to shift the former lengthwise to rock the clutch lever into a position to bring the clutch collar 20 into clutching engagement with the gear 28. When the lever 36 is engaged with the high portion of the cam 27, as shown in Figure 9, the clutch lever is urged by its spring 33 in a direction to couple the clutch collar with the worm 24. This represents the normal position of the parts after a record has been played, but in readiness to initiate the cycle of operations for presenting the next selected record for play upon the deposit of a coin in the machine. When the machine is thus started, motion is transmitted to the shaft 21 and thence to the cam shaft 26, causing the lever 36 to be immediately urged by the spring 42 into the deep notch 39 of the cam, and the tie bar 40 to be moved by that same spring to shift the clutch lever in a direction to release its clutch collar from the worm 34 into coupling engagement with the gear 28 and thereby transmit motion to the countershaft 30 to initiate the operation of the selective record-changing mechanism of the phonograph. As will later appear, this countershaft also transmits motion to a selector-actuating shaft 44 through the medium of bevel gears 45, and which shaft is operatively connected to my improved selector mechanism.

Figure 10:
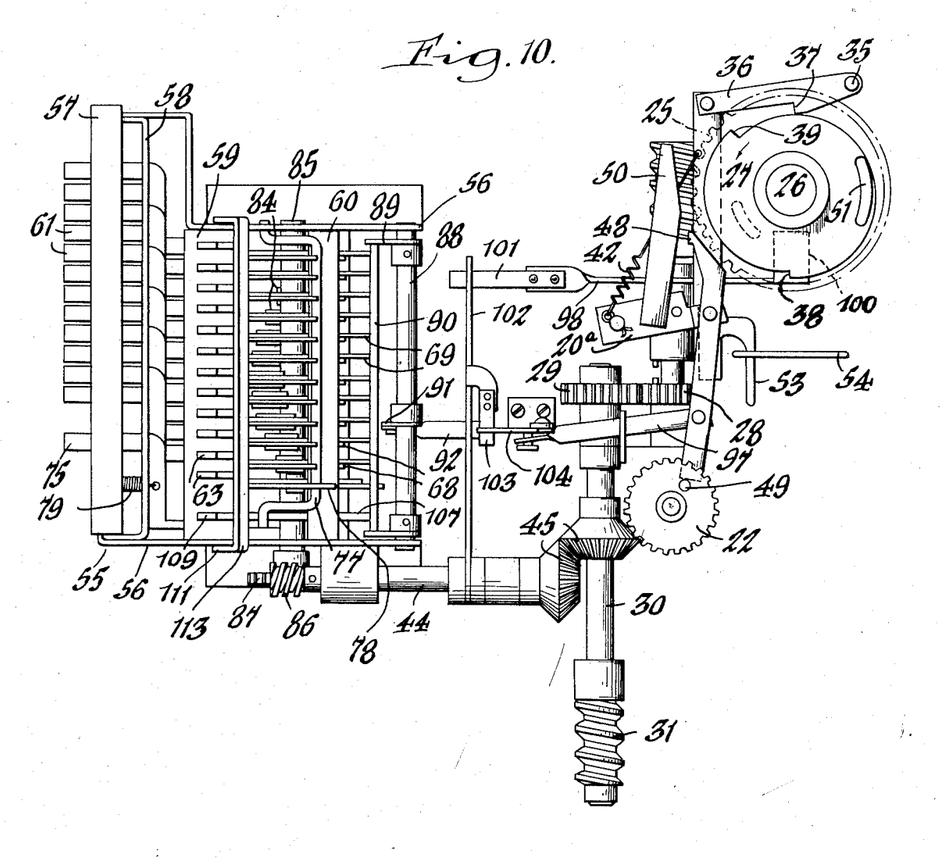
Figure 10 is a similar top plan view with the parts in position corresponding to that shown in Figure 4.
Figure 11:
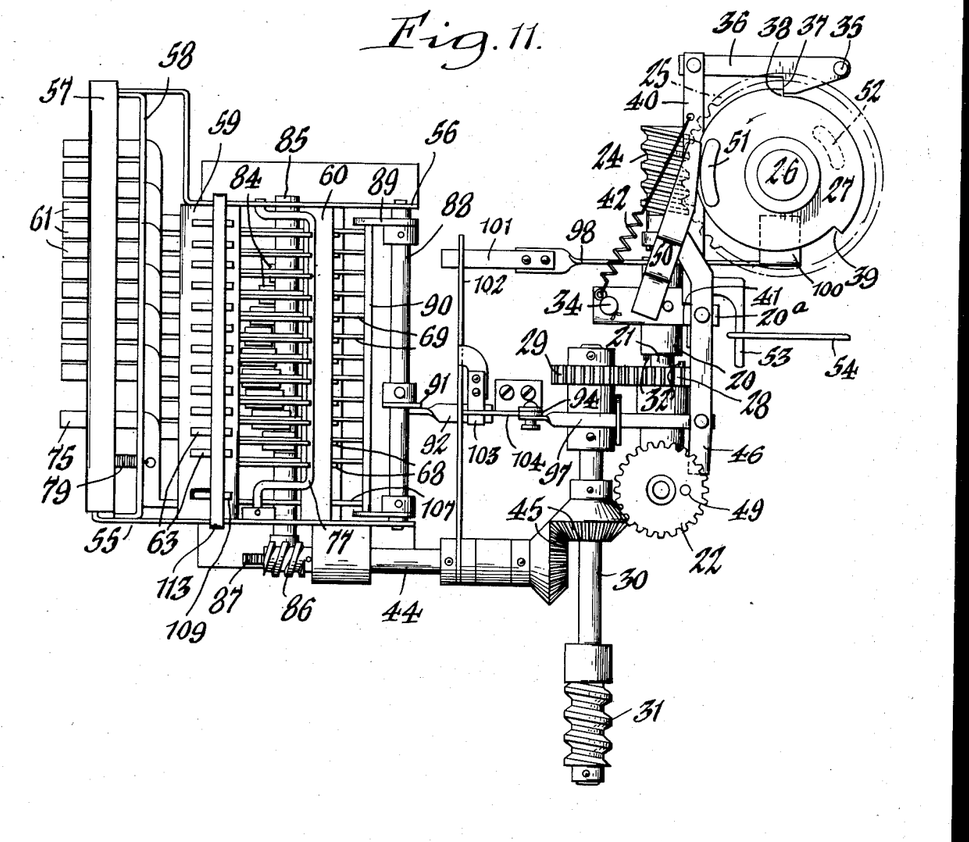
Figure 11 is a similar view with the parts in position corresponding to that shown in Figure 5, which is the position of the parts during the playing of a selected record.

When a selecting cycle is completed, a horizontally-swinging thrust member or rock lever 46 pivoted intermediate its ends at 47 to the clutch lever 20ª, and in bearing contact at one end through a lug 48 with the opposing edge of the tie bar 40, is adapted to actuate said bar in a direction to release its shoulder 41 from the clutch lever, whereupon the spring 33 swings such lever in a direction to couple its clutch collar with the worm 24. As will later appear, this clutch-releasing lever 46 is initiated to such position by my improved selector mechanism, whereby the turntable is arrested at the elevation of the selected record and the record stack split above it when the clutch collar 20 is engaged with the worm 24. During the stack-splitting operation the tooth 37 on the lever 36 drops into the shallow notch 38 of the cam 27 and the spring 42 urges the tie bar 40 in a direction to shift the clutch collar to its neutral position shown in Figure 10, which represents the position of the parts during the playing of a record. In the selector-governed, actuated position of the lever 46, shown in Figure 10, a stud 49 on the gear 22 is adapted, at a predetermined time, to encounter the opposing end of such lever to shift it longitudinally to its initial position shown in Figure 9, and wherein the clutch lever 20ª is simultaneously shifted into latching engagement with the tie bar. In the neutral position of the parts shown in Figure 11, a stop arm 50 projecting from the clutch lever is adapted to abut against a stop lug 51 rising from the top face of the cam 27 to positively prevent swinging of said lever toward the gear 28. Projecting from its bottom face this cam has a second lug 52 which cooperates with a part of the selector mechanism in a manner which will hereinafter appear.

When the playing of a selected record is completed, the tie bar 40 is automatically released from latching engagement with the clutch lever to permit the spring 33 to shift such lever into clutching engagement with the worm 24. For this purpose, the free end of the tie bar has a lateral projection 53 with which an actuatable part 54 of the record-changing mechanism of the phonograph is connected, whereby at a predetermined time the tie bar will be released from the clutch lever.

My improved selector mechanism, having been shown by way of example with the selectively governed mechanism of an automatic selective type of phonograph, is preferably constructed as follows:

The operating parts of this mechanism are supported as a unitary structure on a suitable frame, indicated generally by the numeral 55, mounted at a convenient location on the phonograph chassis for selectively controlling the shifting of the previously described clutch assembly which in turn governs the record-changing mechanism of the phonograph in accordance with the record or records selected. This frame consists of laterally-spaced end walls 56 and a plurality of guide bars 57, 58, 59 and 60 disposed lengthwise in spaced relation between these end walls, the latter being anchored in any suitable fashion to the base of the phonograph chassis. Guided in suitable openings in the guide bars 57, 58, 59 are a plurality of selector elements or push rods 61, corresponding in number to the records, which may be disposed in two horizontal rows in the manner shown in Figure 1 and whose shanks are suitably bent or curved so that the inner ends 62 of the respective selector elements are disposed in horizontal alinement, these ends projecting inwardly from the guide bar 59 as shown in Figures 2–6, inclusive. Corresponding in number to and disposed in operative relation with the inner ends of the selector elements are a plurality of vertically-swinging levers 63 pivoted at their lower ends on a common pivot rod 64 supported in the frame walls 56 and guided adjacent their upper and lower ends in alining slots 65 formed in inwardly-bent flanges 66 at the upper and lower ends of the guide bar 59, each of these levers being movable by its companion selector element 61 from a non-selective position shown in Figure 2 to a selective governing position shown in Figures 3 and 4.

Pivotally mounted at 67 on each of the levers 63 is a pair of adjoining vertically-swinging, selector-governing levers 68, 69 which are normally supported in a substantially horizontal position and against downwardly-swinging movement at their free ends on a supporting bar 70 disposed between the frame walls 56 and at a point in advance of and below the guide bar 60, the latter having vertical slots 71 therein for guiding such pair of levers during their displacement. Adjacent its free end the selector-governing lever 68 has a laterally bent lug 72 at its top edge which overhangs and bears on the top edge of the companion lever 69 to compel simultaneous movements of such levers at predetermined times in the selective operation. A spring 73 connected to each of the levers 68 tends constantly to swing such lever and its companion lever downwardly as well as outwardly, and in addition thereto rock the associated lever 63 outwardly, whereby these parts are normally retained in the non-selective position shown in Figure 2. At its inner free end each lever 68 has a depending lug or shoulder 74 which is adapted to latch behind the inner edge of the cross bar 70 to retain such lever and associated parts 63 and 69 in a forwardly-advanced selecting position, shown in Figure 3.

Figure 5:
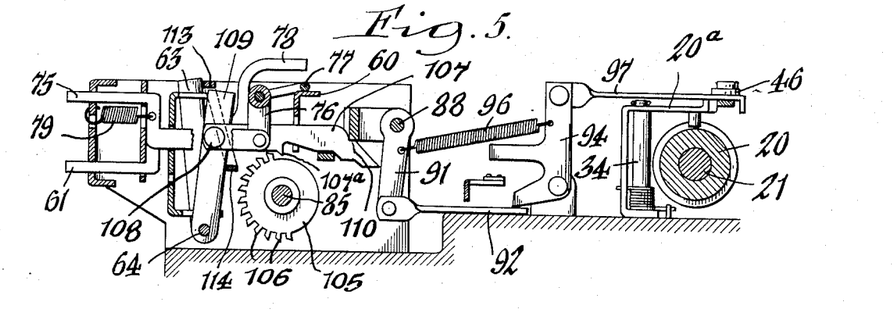
Figure 5 is a cross section taken substantially in the plane of line 5—5, Figure 1, showing that part of the selector mechanism for governing the sequential playing of records when individual selection is not made.

In order to release a given selector button assembly 61, 63, 68 and 69 from a selective position, I provide an auxiliary or cancelling button or element 75 which is connected by a crank arm 76 to a cancelling bail 77 common to the selector-governing levers and normally resting on the top side of the guide bar 60 and adapted, when swung upwardly, to engage an extension 78 formed on each of the companion selector-governing levers 68, as shown in Figure 5, to accordingly raise any such lever or levers previously selected and unlatch them from the cross bar 70 and cause the spring 73 to return such levers and the remaining parts of the companion push button assembly to their initial retracted position. A spring 79 connected to the cancelling element normally urges such element to its retracted position and the connecting bail 77 to a downwardly-swung position resting upon the cross bar 60. This cancelling button may be located at one end of the rows of selector buttons and is likewise guided in the frame-bars 57, 58 and 59.

The selector-governing lever 69, companion to the latching lever 68 of a given selector button assembly, extends at its free end some distance beyond that of the latter and terminates in a downwardly-sloping projection 80 having at its junction with such lever upwardly and downwardly-facing shoulders 81 and 82, respectively, the lower shoulder 82 in the retracted non-selective position of the parts, shown in Figure 2, being adapted to rest upon the top side of the frame bar 70. Projecting from the bottom edge and substantially midway thereof, this lever 69 has a depending tooth 83, which, at a predetermined time in the selecting cycle, is adapted to be tripped to swing said lever 69 upwardly together with the companion lever 68, for a purpose which will hereinafter appear.

Figure 3:
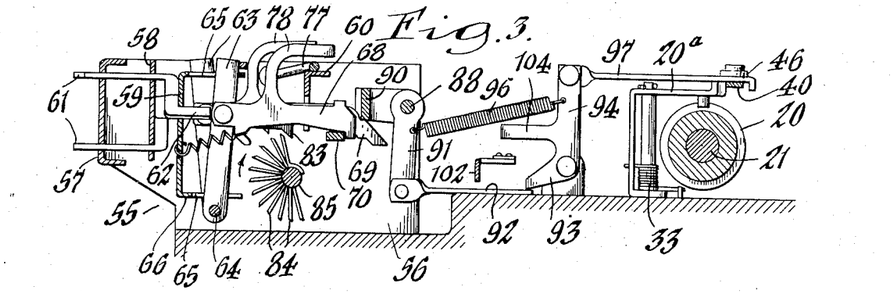
Figure 3 is a cross section similar to Figure 2, but showing the position of the parts after a given selection has been executed by the depression of a selector element.
Figure 4:
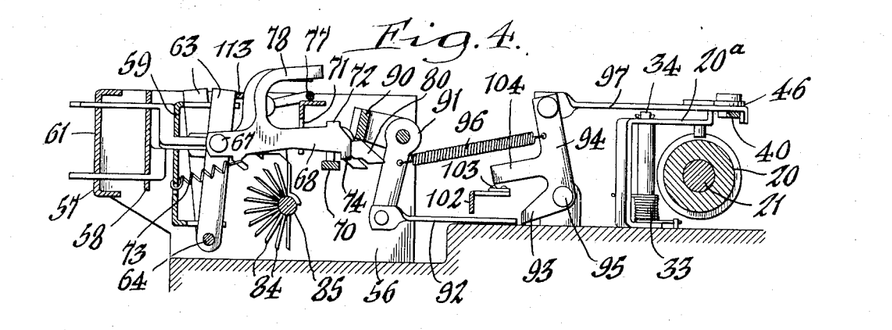

In the retracted, non-selective position of the selector button units, the lever-teeth 83 are disposed in sidewise alinement, and when one or more of the selector elements 61 are depressed to a selective position, the teeth of the projected levers 69 assume an advanced position, as shown in Figure 3, for selective actuation by companion radial trip arms 84 secured to a horizontal shaft 85 disposed below said levers forwardly of the pivot rod 64 and journaled in the end walls 56 of the frame. These trip arms correspond in number to and are arranged in spiral-like fashion lengthwise of the shaft 85 and spaced longitudinally thereof and in the operating plane of the respective selector-governing levers 69. In the retracted position of a given selector assembly, its lever-tooth 83 is clear of the circular or operating path of the trip arms 84. This shaft 75 is driven from the selector-actuating shaft 44 whenever the clutch 20 is operatively engaged with the gear 28, said shaft having a worm 86 thereon meshing with a worm wheel 87 fixed on the adjoining end of the shaft 85. When the latter is rotated in a clockwise direction, viewing Figures 1, 2, 3 and 4, one or another of its trip arms 84 encounters an alined selectively-positioned tooth 83 of a selector button assembly and causes the companion selector-governing lever 69 to be swung upwardly about its pivot 67 from the position shown in Figure 3 to the position shown in Figure 4, such movement also causing an upward displacement of the companion selector-governing lever 68 by reason of the overhanging coupling lug 72. This tripping movement of the parts initiates the actuation of a mechanism for effecting the automatic shifting of the clutch lever 20 from clutching engagement with the gear 28 to a position to bring the clutch collar 20 into clutching engagement with the worm 24, to thereby complete the cycle of operations of the selectively-governed mechanism of the phonograph.

This clutch actuating mechanism initiated by the tripping action just described is preferably constructed as follows:

The numeral 88 indicates a rock shaft disposed parallel to but above the plane of the selector-tripping shaft 85 and journaled at its ends in the rear portion of the frame 55. Connected by cranks 89 fixed to this shaft is a lifter bar 90 which extends lengthwise between the frame-walls 56 and is adapted to bear at its bottom edge on the upwardly-facing shoulders 81 of the selectively-depressed trip levers 69 of the push button assembly, as shown in Figure 3. In the non-selective position of these parts, this lifter bar engages the sloping forward edge of the lever-extension 80, as shown in Figure 2. Intermediate its ends the rock shaft 88 has fixed thereto a depending crank arm 91 to the free end of which is pivoted an inwardly-facing reciprocating slide bar 92 resting on the adjoining face of the phonograph chassis. This slide bar is adapted to be moved into and out of supporting engagement with an oppositely-facing foot 93 formed on a vertically-swinging rock lever 94 pivoted at 95 to the phonograph chassis. A spring 96 connected at one end to this rock lever and at its opposite end to the crank arm 91 tends constantly to swing such rock lever in an outward direction to lower its foot 93. At its upper end the rock lever 94 is connected by a thrust bar or link 97 with the thrust lever 46 of the clutch-releasing mechanism. By this construction, assuming the parts to be in the selective position shown in Figure 3, when a given selector-governing lever 69 is elevated by a companion trip arm 84 of the selector shaft 85, the free end of such lever actuates the lifter bar 90 upwardly to accordingly rock the crank 91 in a direction to longitudinally displace the slide bar 92 in a direction to release it from supporting engagement with the foot 93 of the rock lever 94, thereby causing the spring 96 to urge such last-named lever in a direction to pull the thrust bar 97 from the position shown in Figure 3 to that shown in Figure 4. This movement causes the thrust lever 46 associated with the clutch mechanism to be moved to a position to release the tie bar 40 from the clutch lever 20ª and enable the latter to be shifted to effect the clutching of the worm 24 with the driven shaft 21.

Figures 1, 4, 7, 8:
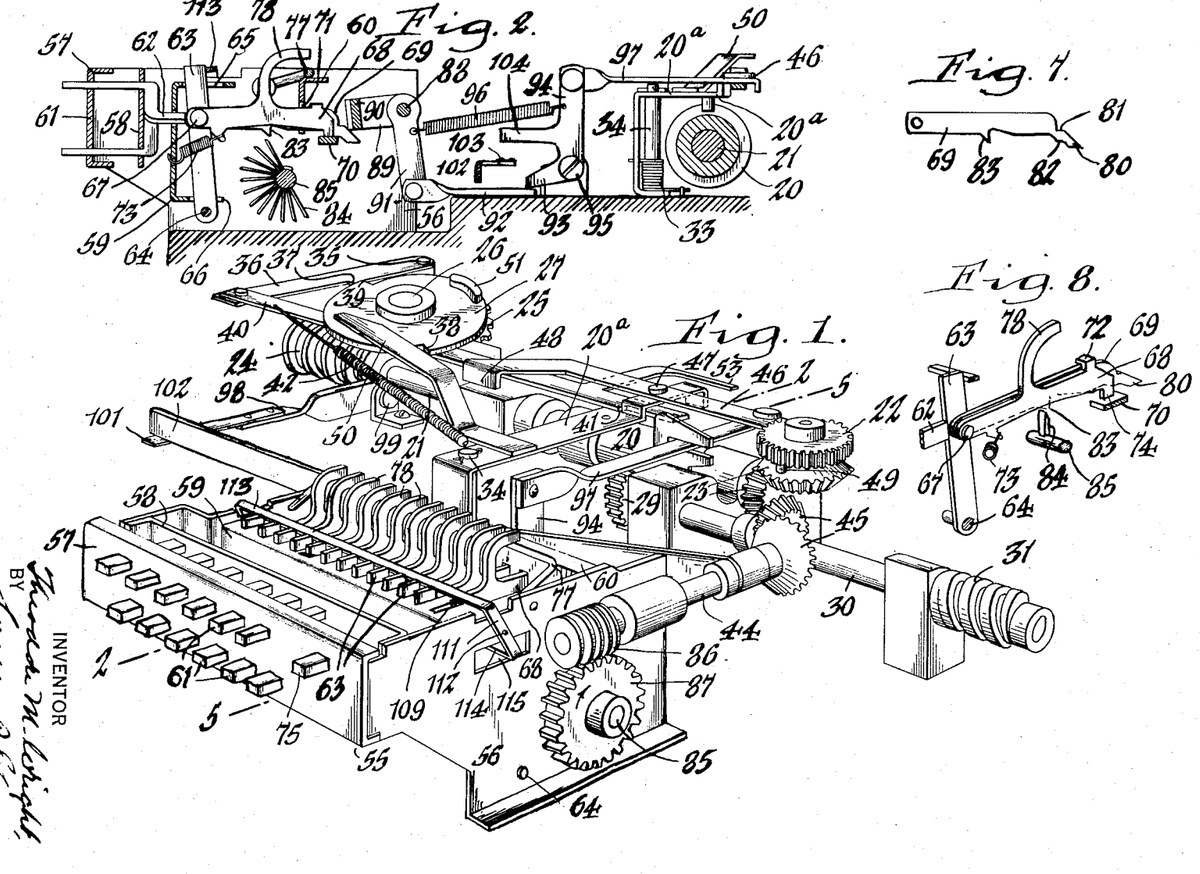
Figure 1 is a perspective view of my selector mechanism shown in operative relation to the selectively controlled mechanism of an automatic phonograph.
Figure 4 is a similar view showing the position of the parts at the time the selective operation is registered or transmitted to the selective control mechanism of the phonograph.
Figure 7 is a side view of one of the selector-actuated elements for governing the selective mechanism of the phonograph.
Figure 8 is a fragmentary perspective view of one of the selector-governing units and associated parts.

It will be noted that when the parts 90, 91, 92 and 94 are shifted to the selector-effecting position shown in Figure 4, the selector-governing levers 68, 69 are released from latching engagement with the bar 70 and are thereupon promptly restored to their initial or non-selective position shown in Figure 2, by the spring 73, and the aforesaid parts are then retained in their position shown in Figure 4 by the bar 92 abutting endwise against the toe 93 of the rock lever 94.

When the worm 24 has performed the operation intended of it, in this case transmitting motion to the cam 27 and such others parts which govern the splitting of the record stack above the record selected for play, a means is provided for effecting the automatic restoration of the rock lever 94 and associated lifter bar 90, crank 91 and reciprocating slide 92 to their initial position preparatory to the next selecting cycle of operations. To this end, a lever 98 is provided which extends transversely beneath the driven shaft 21 adjoining the worm 24, the same being pivoted intermediate its ends at 99 and provided at its inner end with a lateral projection 100 which is disposed in the path of travel of the lug 52 on the cam 27, as shown in Figure 9. At its opposite end, this lever is provided with a flat spring extension 101 which abuts at its top side against the lower edge of one end of another lever 102 disposed at substantially right angles thereto and pivoted at its other end on the shaft 44. Intermediate its ends, this lever 102 has a tappet lug 103 thereon which is disposed beneath a finger 104 formed on the rock lever 94. With the position of the parts shown in Figures 4 and 9, the cam-lug 52 encounters the projection 100 of the lever 98 and causes the latter to swing in a direction to impart an upward movement to the companion lever 102, and thereby, through the medium of the cooperating lug 103 and finger 104, cause the rock lever 94 to be swung from the position shown in Figure 4 to the position shown in Figures 2 and 3. Simultaneously with this movement the spring 96 is strained and causes the rock shaft 88 to be turned in a direction to restore the lifter bar 90 and the reciprocating bar 92 to their initial position shown in Figure 2, wherein the toe 93 of said rock lever 94 is again supported on the reciprocating bar 92 and the lifter bar 90 is in bearing contact with the sloping inner ends of the extensions 80 of the selector-governing levers 69.

Figure 6:
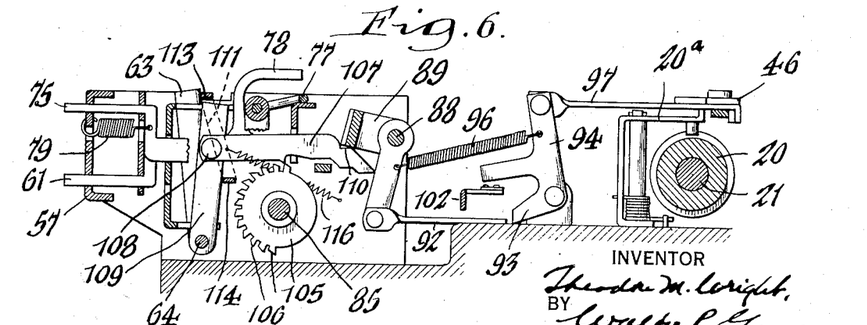
Figure 6 is a view similar to Figure 5, showing the position of the parts in an operative sequential selecting position.

Fixed on that end of the shaft 85 adjoining the cancelling selector rod 70 is a wheel 105 having teeth 106 over substantially half of its periphery and which are arranged radially in registering alinement with the selector trip arms 84. Disposed in the plane of this toothed wheel and above the same is a lever 107 similar to the levers 69 and pivoted at 108 to a vertically-swinging upright lever 109 which is similar to the levers 63 but somewhat shorter, as can be seen in Figures 5 and 6. The shouldered end 110 of the lever 107 constantly lies beneath the lower edge of the lifter bar 90, while its tooth 107a is adapted to be engaged by a companion tooth on the wheel 105 to successively trip the lever 107 and associated parts from the position shown in Figure 5 to the position shown in Figure 6, and effect a sequential playing of the records when none are pre-selected.

The numeral 111 indicates an oscillatory or crank-like member pivoted at 112 to the side walls 56 of the selector frame and having a top bar 113 which extends crosswise in advance of the upper ends of the several levers 63 and is normally in engagement with the inner edges thereof. At the opposite side of its pivot this crank member terminates at one end in a trip lug 114 which passes through an opening 115 in the right hand plate 56, as shown in Figure 1, and which is in contact with the adjoining edge of the lever 109. By this construction, when any lever 63 is selectively pressed forward by its companion selector rod 61 the crank 111 is rocked about its pivot to cause the trip lug 114 to swing in the opposite direction to rock the lever 109 outwardly and shift the lever 107 to a retracted position where its tooth 107a clears the toothed wheel 105 and wherein its shouldered end 110 is clear of supporting engagement with the lifter bar 90. A spring 116 connected to the lever 107 constantly tends to urge it and the upright lever 109 to their normal forward-seeking position and likewise urge the crank member 112 in a direction to retain its bar 113 against the levers 63.

The worm 86 and worm wheel 87 are in such ratio that the shaft 85 makes a fractional turn equal to the distance between adjoining trip arms 84 and trip teeth 106 while a record is passing from a storage position to a selective playing position. Thus, when a trip arm or tooth displaces any one of the levers 69 or the lever 107, respectively, and the lifter bar 90 is raised to withdraw the slide bar 92 from the toe 93 of the clutch-actuating lever 94, and the clutch 20 is released from the gear 28, the record-selecting mechanism is arrested with the record corresponding to such arm or tooth at its proper playing elevation or position.

Figure 12:
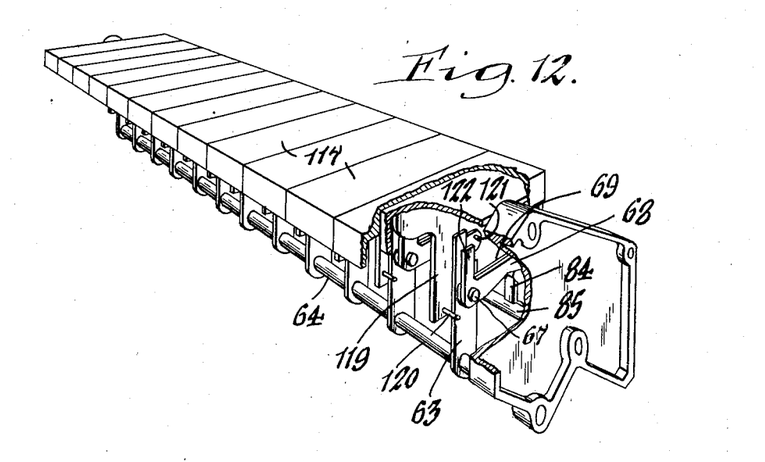
Figure 12 is a sectional perspective view of a modified embodiment of the invention.
Figures 13, 14:
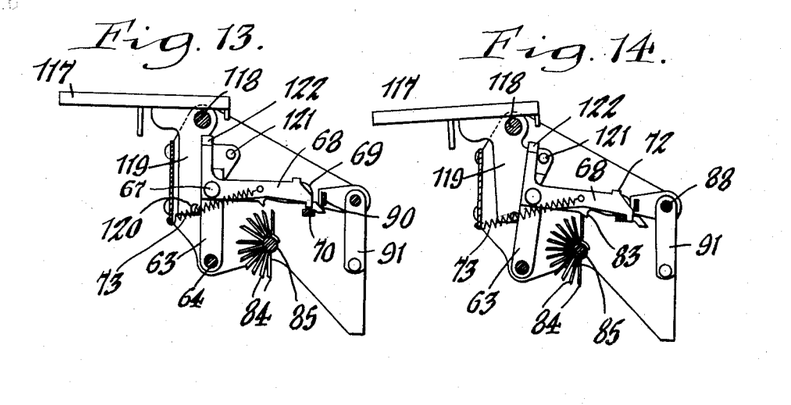
Figures 13 and 14 are cross sections thereof taken in the plane of line 13—13 and showing non-selective and selective positions of the parts, respectively.

In the modified form of the invention shown in Figures 12-14, inclusive, instead of push button selector elements, piano-like keys 117 are employed which are alined horizontally of the selector frame and pivoted adjacent their inner ends on a common horizontal pivot rod 118. The remaining parts of the selector mechanism actuated by these keys are, with one exception, identical in construction with those parts heretofore described and have therefore been identified with like reference characters. Depending from each key is an arm 119 having a transverse stud 120 adjacent its lower end which is adapted to abut against the outer edge of the companion upright lever 63, so that when the key is depressed, said lever and the companion selector-governing levers 68, 69 are shifted from the position shown in Figure 13 to the position shown in Figure 14, in readiness to be tripped by a companion arm 84 on the selector shaft 85 to initiate the clutch-shifting operation in the manner heretofore described.

For the purpose of cancelling a selection once made by depressing the companion key, I provide the upper end of the depending key-arm 119 with a transverse stud 121 disposed for abutting engagement with a substantially upright extension 122 on the lever 68. By this construction, when a key is depressed to the position shown in Figure 14, the lever-extension 122 abuts the stud 121, so that when the patron raises the key by an upward thrust, this stud causes the lever 68 to be rocked about its pivot and to be unlatched from the bar 70, causing the spring 73 to restore the associated parts to their initial or non-selecting position.

I claim as my invention:

1. A selector mechanism of the character described, comprising a part shiftable from a normally non-selective to a selective-governing position, a plurality of manually shiftable selector elements including portions movable thereby to pre-set positions in operative relation to said shiftable part and companion co-parallel portions for latching the first-named portions in such pre-set positions, and means operatively engageable with said pre-set positioned selector portions for selectively projecting them in a direction to actuate said shiftable part to a selective-governing position and their companion portions to an unlatching position.

2. A selector mechanism of the character described, comprising a part shiftable from a normally non-selective to a selective-governing position, a plurality of manually-operated selector elements projectable from a non-selective to a selective position, displaceable means interposed between said shiftable part and said selector elements and operatively connected to the latter for projecting such means in one direction to a pre-set position in operative relation to such shiftable part, and movable means operatively engageable with said displaceable means, when projected, for selectively projecting them in another direction to actuate said shiftable part to a selective-governing position.

3. A selector mechanism of the character described, comprising a part shiftable from a normally non-selective to a selective-governing position, a plurality of manually shiftable selector elements including portions movable thereby to pre-set positions in operative relation to said shiftable part, means operatively associated with the companion shiftable selector elements for releasably latching them and their movable portions in their shifted pre-set positions, and means operatively engageable with said pre-set positioned selector portions for selectively projecting them in a direction to actuate said shiftable part to a selective-governing position, each of said latching means being released in response to the movement of the companion pre-set selector portion to its selective-governing position.

4. A selector mechanism of the character described, comprising a part shiftable from a normally non-selective to a selective-governing position, a plurality of manually shiftable selector elements including portions movable thereby to pre-set positions in operative relation to said shiftable part, means operatively associated with the companion shiftable selector elements for releasably latching them and their movable portions in their shifted pre-set positions, means operatively engageable with said pre-set positioned selector portions for selectively projecting them in a direction to actuate said shiftable part to a selective-governing position, and means coupling said latching means with the companion pre-set portions of the selector elements for compelling the release of the latching means when such companion pre-set portions are actuated to their selective-governing positions.

5. A selector mechanism of the character described, comprising a part shiftable from a normally non-selective to a selective-governing position, a plurality of manually shiftable selector elements including portions movable thereby to pre-set positions in operative relation to said shiftable part, means operatively associated with the companion shiftable selector elements for releasably latching them and their movable portions in their shifted pre-set positions, means operatively engageable with said pre-set positioned selector portions for selectively projecting them in a direction to actuate said shiftable part to a selective-governing position, and resilient means operatively connected to said selector elements for restoring them and their associated parts to initial position upon the actuation of said shiftable part to its selective-governing position.

6. A selector mechanism of the character described, comprising a part shiftable from a normally non-selective to a selective-governing position, a plurality of manually-projectible selector elements including relatively displaceable, selector-governing portions disposed side by side in alining relation and advanceable thereby to pre-set positions in operative relation to said shiftable part, each of said portions having a projection thereon, and a rotatable shaft having means thereon in the plane of and companion to said selector-governing portions for tripping engagement therewith when in pre-set position to selectively displace them in a direction to actuate said shiftable part to a selective-governing position.

7. A selector mechanism of the character described, comprising a part shiftable from a normally non-selective to a selective-governing position a plurality of manually-projectible selector elements including relatively displaceable, selector-governing portions disposed side by side in alining relation and advanceable thereby to pre-set positions in operative relation to said shiftable part, each of said portions having a projection thereon, and a rotatable shaft having radial trip arms thereon disposed in substantially spiral fashion about the same and in the plane of and companion to said selector-governing portions for operative engagement therewith when in pre-set position to selectively displace them in a direction to actuate said shiftable part to a selective-governing position, the tripping projections on the selector-governing portions being out of the operative path of the trip arms in the retracted, non-selective positions of the selector elements.

8. A selector mechanism of the character described, comprising a part shiftable from a normally non-selective to a selective-governing position, a plurality of manually-projectible selector elements including relatively displaceable, selector-governing portions disposed side by side in alining relation and advanceable thereby to pre-set positions in operative relation to said shiftable part, each of said portions having a projection thereon, a rotatable shaft having means thereon in the plane of and companion to said selector-governing portions for tripping engagement therewith when in pre-set position to selectively displace them in a direction to actuate said shiftable part to a selective-governing position, a displaceable, second selector-governing member for controlling the successive actuation of said shiftable part to selective-governing positions when no pre-selections are made by the selector elements, an operative connection between said elements and said second selector-governing member for normally urging the latter to a pre-set position in operative relation to said shiftable part and for correspondingly urging the same to a retractive inoperative position when any one of the selector elements is advanced to a selective position, and means on said shaft having an annular row of teeth thereon in the plane of said second selector-governing member for engagement therewith, when in its pre-set position, to actuate said shiftable part to a selective-governing position.

9. A selector mechanism of the character described, comprising a part shiftable from a normally non-selective to a selective-governing position, a plurality of manually shiftable selector elements including portions movable thereby to pre-set positions in operative relation to said shiftable part, means operatively associated with the companion shiftable selector elements for releasably latching them and their movable portions in their shifted pre-set positions, means operatively engageable with said pre-set positioned selector portions for selectively projecting them in a direction to actuate said shiftable part to a selective-governing position, a manually-operated element for effecting the cancellation of any selectively-positioned selector elements, and an operative connection between said cancelling element and the companion latching means of the selector elements for releasing such latching means to cause the selector elements and associated parts to return to their initial non-selective positions when said cancelling element is rendered operative.

10. A selector mechanism of the character described, comprising a part shiftable from a normally non-selective to a selective-governing position, a plurality of manually shiftable selector elements including portions movable thereby to pre-set positions in operative relation to said shiftable part, means operatively associated with the companion shiftable selector elements for releasably latching them and their movable portions in their shifted pre-set positions, means operatively engageable with said pre-set positioned selector portions for selectively projecting them in a direction to actuate said shiftable part to a selective-governing position, a manually-operated element for effecting the cancellation of any selectively-positioned selector elements, the selector element latching means having extensions thereon, and an operative connection between said cancelling element and the extensions of said latching means for releasing the latter to cause the selector elements and associated parts to return to their initial non-selective positions when the cancelling element is rendered operative, said means including a crank, and a bail actuated thereby and common to and disposed in operative relation to the extensions of said latching means.

11. A selector mechanism comprising a frame, a part mounted at the rear end thereof and adapted to be shifted from a non-selective to a selective-governing position, a plurality of manually-operated selector elements disposed at the front end of said frame and projectable from a non-selective to a selective position, and a selector-governing assembly interposed between the aforesaid parts including a plurality of pairs of levers corresponding in number and companion to the selector elements and operatively connected thereto to move jointly therewith to and from pre-set, selective-governing positions, one of the levers of each pair constituting a latch for releasably retaining the companion selector-governing assembly in its advanced, pre-set selecting position and the companion lever, when in such pre-set position, being operatively engageable with said shiftable part, and means engageable with the last-named lever of each pair, when in pre-set position, for rocking it about its pivot in a direction to actuate said shiftable part to a selective-governing position.

12. A selector mechanism comprising a frame, a part mounted at the rear end thereof and adapted to be shifted from a non-selective to a selective-governing position, a plurality of manually-operated selector elements disposed at the front end of said frame and projectable from a non-selective to a selective position, and a selector-governing assembly interposed between the aforesaid parts including a plurality of pairs of levers corresponding in number and companion to the selector elements and operatively connected at one end thereto to move jointly therewith to and from pre-set, selective-governing positions, a spring connected to each selector assembly and its companion selector element for normally urging such parts to a retracted non-selective position, a member disposed beneath the opposite free ends of said pairs of levers for supporting and guiding them, one of the levers of each pair constituting a latch adapted to be releasably interlocked with said supporting member for retaining the companion selector-governing assembly in its advanced pre-set position and the companion lever in a like position in operative relation to said shiftable part, and means engageable with the last-named lever of each pair, when in pre-set position, for rocking it about its pivot in a direction to actuate said shiftable part to a selective-governing position and for simultaneously actuating the latched lever to its released position.

13. A selector mechanism, comprising a frame, a part mounted at the rear end thereof and adapted to be shifted from a non-selective to a selective-governing position, a plurality of manually-operated selector elements disposed at the front end of said frame and projectable from a non-selective to a selective position, and a selector-governing assembly interposed between the aforesaid parts including a plurality of pairs of levers corresponding in number and companion to the selector elements and operatively connected thereto to move jointly therewith to and from pre-set selective-governing positions, one of the levers of each pair constituting a latch for releasably retaining the companion selector-governing assembly in its advanced, pre-set selecting position and the companion lever, when in such pre-set position, being operatively engageable with said shiftable part, and means engageable with the last-named lever of each pair, when in pre-set position, for rocking it about its pivot in a direction to actuate said shiftable part to a selective-governing position, the selective-governing levers of each pair having a coupling connection to each other to compel a joint pivotal displacement of the levers in one direction to their latched pre-set position when advanced thereto by the companion selector element and a joint pivotal displacement thereof in the opposite direction when said shiftable part is actuated to its selective-governing position to release such levers from their latched position.

14. A selector mechanism, comprising a frame, a part mounted at the rear end thereof and adapted to be shifted from a non-selective to a selective-governing position, a trip lever normally in operative engagement with said shiftable part to restrain its movement in one direction and adapted, when tripped, to actuate such part to a selective-governing position, a spring connected to said lever for yieldingly resisting its movement out of normal position, means in supporting engagement with said trip lever to limit its movement in a direction away from said shiftable part, and an intermittently rotatable means having projections thereon in the plane of the trip lever and successively engageable therewith for tripping such lever to actuate the shiftable part to its selective-governing position.

15. The combination with a clutch mechanism, having a spring-urged actuating lever and a selectively controlled shiftable part in operative engagement with said lever for normally releasably retaining the same in a given clutch-engaging position, of a selector mechanism for actuating said shiftable part to release said lever to a different clutch-engaging position, comprising an intermittently rotatable selector-controlling shaft having projections thereon, universally displaceable selector-governing means disposed for movement in one plane into and out of operative relation to said shiftable part and said shaft-projections, and means operatively connected to said displaceable means for moving it to and from such positions, said selector-governing means including a part displaceable in a different plane and adapted to be actuated by a companion shaft-projection for moving said shiftable part to a position released from said clutch-controlling lever.

16. A selector mechanism of the character described, comprising a frame, a plurality of manually shiftable selector elements mounted on said frame, a part in governing relation to said selector elements and shiftable from a normally non-selective to a selective-governing position, a rotatable selector-controlling shaft journaled in said frame and disposed between the selector elements and the part governed thereby, and selector-governing means disposed in correlation with said selector elements, said selector-controlling shaft and said selective-governed part and corresponding in number to and projectible by the companion selector elements to a selective-governing position and each including a pair of vertically-swinging levers normally supported against downward-swinging movement at their free ends on a common supporting member, one of said levers having a projection thereon for operative tripping engagement with said selector-controlling shaft at a predetermined time in the selecting cycle to cause an upward displacement of such lever to shift said selective-governed part to a selective-governing position, the other lever having a shouldered portion thereon engageable with said supporting member for latching it and its companion lever in a projected selective position and having a connection to said companion lever for compelling simultaneous movements of said levers at predetermined times in the selecting cycle, and means for restoring the selector governing means to a retracted position at a predetermined time in the selecting cycle, the projections on the levers tripped by the selector shaft being out of tripping position in the retracted non-selective position of such selector-governing means.

THEODORE M. WRIGHT.